(12) United States Patent
Chen et al.

(10) Patent No.: US 12,095,541 B2
(45) Date of Patent: Sep. 17, 2024

(54) BEAM MANAGEMENT METHOD AND APPARATUS, AND NETWORK SIDE DEVICE, TERMINAL AND STORAGE MEDIUM

(71) Applicant: DATANG MOBILE COMMUNICATIONS EQUIPMENT CO., LTD., Beijing (CN)

(72) Inventors: Shanzhi Chen, Beijing (CN); Xin Zhang, Beijing (CN); Qiubin Gao, Beijing (CN); Qiuping Huang, Beijing (CN); Shiqiang Suo, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 59 days.

(21) Appl. No.: 17/801,783

(22) PCT Filed: Jan. 26, 2021

(86) PCT No.: PCT/CN2021/073741
§ 371 (c)(1),
(2) Date: Aug. 23, 2022

(87) PCT Pub. No.: WO2021/175047
PCT Pub. Date: Sep. 10, 2021

(65) Prior Publication Data
US 2023/0086334 A1 Mar. 23, 2023

(30) Foreign Application Priority Data
Mar. 6, 2020 (CN) .......................... 202010152649.0

(51) Int. Cl.
*H04B 7/06* (2006.01)
*H04B 7/08* (2006.01)

(52) U.S. Cl.
CPC ......... *H04B 7/0695* (2013.01); *H04B 7/0617* (2013.01); *H04B 7/086* (2013.01); *H04B 7/088* (2013.01)

(58) Field of Classification Search
CPC .... H04B 7/0617; H04B 7/0695; H04B 7/086; H04B 7/088
See application file for complete search history.

(56) References Cited

U.S. PATENT DOCUMENTS

2016/0047884 A1 2/2016 Zhang et al.
2018/0368142 A1 12/2018 Liou
(Continued)

FOREIGN PATENT DOCUMENTS

CN 108288980 A 7/2018
CN 108781103 A 11/2018
(Continued)

OTHER PUBLICATIONS

Fraunhofer IIS et al., "UE Procedures for transmitting UL PRS", 3GPP TSG RAN WG1 Meeting #97, Reno, US, May 13-17, 2019, total 10 pages, R1-1907089.
(Continued)

*Primary Examiner* — David S Huang
(74) *Attorney, Agent, or Firm* — Kilpatrick Townsend & Stockton LLP

(57) ABSTRACT

Provided are a beam management method and apparatus, and a network side device, a terminal and a storage medium. The method includes receiving beam information for beam management sent by a terminal, wherein the beam information comprises uplink beam information or downlink beam information; determining specified information for beam management according to the beam information, wherein the specified information comprises terminal location information and/or beam quality information; and determining
(Continued)

transmission beams for signal transmission and/or a trend of transmission beam change according to the specified information and network deployment information, wherein the signal transmission comprises uplink signal transmission or downlink signal transmission. The great overhead and delay problems caused by the frequent beam sweeping process in high-speed occasions can be solved, the beam management strategy can be optimized and beam sweeping time and beam overhead can be saved.

20 Claims, 4 Drawing Sheets

(56) References Cited

U.S. PATENT DOCUMENTS

| | | | |
|---|---|---|---|
| 2019/0021096 A1 | 1/2019 | Nilsson et al. | |
| 2019/0097712 A1 | 3/2019 | Singh et al. | |
| 2019/0261384 A1 | 8/2019 | Nilsson et al. | |
| 2022/0407581 A1* | 12/2022 | Xu | H04B 7/0695 |

FOREIGN PATENT DOCUMENTS

| | | |
|---|---|---|
| CN | 109996265 A | 7/2019 |
| CN | 110536312 A | 12/2019 |
| CN | 111162827 A | 5/2020 |

OTHER PUBLICATIONS

Ad-hoc Chair (Ericsson), "Chairman's notes of AI 7.2.10 Study on NR positioning support", 3GPP TSG-RAN WG1 Meeting #97, Reno, USA, May 13-17, 2019, total 5 pages, R1-1907849.

European Patent Office, the partial supplementary European search report Issued in Application No. 21764591.0, Feb. 22, 2024, Germany, 15 pages.

* cited by examiner

BEAM MANAGEMENT METHOD AND APPARATUS, AND NETWORK SIDE DEVICE, TERMINAL AND STORAGE MEDIUM

CROSS-REFERENCE TO RELATED APPLICATIONS

The present application is a US National Stage of International Application No. PCT/CN2021/073741, filed on Jan. 26, 2021, which claims priority to Chinese Application No. 202010152649.0 filed on Mar. 6, 2020, entitled "Beam Management Method and Apparatus, and Network Side Device, Terminal and Storage Medium", which are hereby incorporated by reference in their entireties.

FIELD

The present application relates to the field of communication, and in particular, to a method and an apparatus for beam management, a network side device, a terminal and a storage medium.

BACKGROUND

With the increasing scarcity of low-frequency resources, the millimeter wave band has more spectrum resources, which can provide greater bandwidth and become an important for future applications of mobile communication systems.

At present, in high-frequency transmission systems, beamforming transmission can be adopted to provide higher beamforming gain and greater coverage. A base station or a terminal usually obtains a suboptimal beamforming direction by beam sweeping. In the beam sweeping, suboptimal beamforming directions are obtained by measuring signals in different beam directions. The process of beam sweeping usually includes processes such as sending reference signals in different beam directions, performing signal quality measurement, performing beam selection.

However, for the traditional beam sweeping technology, in order to obtain optimal beams in multiple beam directions, it is necessary to send reference signals in multiple beam directions respectively, and select the optimal beam by performing the signal quality measurement respectively. The greater the number of antennas, the stronger the directivity of the beams, and the greater the number of beam directions, then the greater the number of required reference signals, the greater the overhead, and the higher the computational complexity.

SUMMARY

In view of the problems above, the embodiments of the present application provide a method and an apparatus for beam management, a network side device, a terminal and a storage medium.

An embodiment of the present application provides a method for beam management, performed by a network side device, including:
receiving beam information for beam management sent by a terminal, where the beam information includes uplink beam information or downlink beam information;
determining specified information for beam management according to the beam information, where the specified information includes terminal location information and/or beam quality information; and
determining transmission beams for signal transmission and/or a change trend of transmission beam according to the specified information and network deployment information, where the signal transmission includes uplink signal transmission or downlink signal transmission.

In one embodiment, the receiving beam information for beam management sent by a terminal includes:
sending network side configuration information or indication information to the terminal, where the network side configuration information or indication information is used for indicating the terminal to send an uplink signal for beam quality measurement; and
receiving the uplink beam information sent by the terminal, where the uplink beam information includes the uplink signal and/or terminal location information.

In one embodiment, the determining specified information for beam management according to the beam information includes:
measuring quality of the uplink signal in the uplink beam information to obtain beam quality information corresponding to the uplink signal;
determining the beam quality information corresponding to the uplink signal as beam quality information for beam management; and
determining the terminal location information reported by the terminal as terminal location information for beam management.

In one embodiment, the receiving beam information for beam management sent by a terminal, includes:
sending a downlink signal for beam quality measurement to the terminal, the downlink signal is used for indicating the terminal to measure the quality of the downlink signal to obtain beam quality information corresponding to the downlink signal; and
receiving the downlink beam information reported by the terminal, where the downlink beam information includes beam quality information corresponding to the downlink signal and/or terminal location information.

In one embodiment, the determining specified information for beam management according to the beam information, includes:
determining the beam quality information corresponding to the downlink signal as beam quality information for beam management; and
determining the terminal location information reported by the terminal as the terminal location information for beam management; or determining the terminal location information for beam management according to the beam quality information reported by the terminal.

In one embodiment, the terminal location information is a location identifier determined by the terminal according to a rule pre-agreed with the network side; where the location identifier is obtained by positioning of the global positioning system (GPS) of the terminal.

In one embodiment, the terminal location information is angle information of a channel through which the downlink signal passes, and the angle information is used to determine a location of the terminal.

In one embodiment, the network deployment information includes one or more of line map information, beam information covered by the line, network antenna configuration, network topology, beam distribution information or beam location information;

where the beam information covered by the line includes one or more of an optimal beam, a change trend of beam or a change trend of beam quality at each position along the line in different moving directions.

In one embodiment, the network deployment information is pre-stored on the network side device or a cloud device.

In one embodiment, the network deployment information is determined by the network side device according to the beam information reported by all terminals in a specified area within a specified time period, and the location information of all the terminals in the specified area within the specified time period.

In one embodiment, the determining transmission beams for signal transmission and/or a change trend of transmission beam according to the specified information and network deployment information, includes:
  determining a location of the terminal according to the terminal location information;
  determining the network deployment information of the line where the terminal is located according to the location of the terminal; and
  determining transmission beams for signal transmission and/or the change trend of transmission beam according to the network deployment information of the line where the terminal is located and the beam quality information.

In one embodiment, the determining transmission beams for signal transmission and/or the change trend of transmission beam according to the specified information and network deployment information, includes:
  determining a moving direction of the terminal according to the terminal location information; and
  determining transmission beams for signal transmission and/or the change trend of transmission beam according to the moving direction of the terminal and the network deployment information.

An embodiment of the present application provides a method for beam management, performed by a terminal, including:
  determining beam information for beam management, where the beam information includes uplink beam information or downlink beam information; and
  sending the beam information to a network side device for indicating the network side device to determine specified information for beam management according to the beam information, and the specified information and network deployment information being used for determining transmission beams for signal transmission and/or a change trend of transmission beam;
  the specified information includes terminal location information and/or beam quality information, and the signal transmission includes uplink signal transmission or downlink signal transmission.

In one embodiment, the determining beam information for beam management, includes:
  receiving network side configuration information or indication information sent by the network side device, where the network side configuration information or indication information is used for indicating the terminal to send an uplink signal for beam quality measurement; and
  determining the uplink signal and/or terminal location information as the uplink beam information;
  the sending the beam information to a network side device, includes:
  sending the uplink beam information to the network side device for indicating the network side device to measure the quality of the uplink signal in the uplink beam information to obtain beam quality information corresponding to the uplink signal, where the beam quality information corresponding to the uplink signal is the beam quality information for beam management.

In one embodiment, the determining beam information for beam management, includes:
  receiving a downlink signal for beam quality measurement sent by the network side device;
  measuring the quality of the downlink signal to obtain the beam quality information corresponding to the downlink signal; and
  determining the beam quality information corresponding to the downlink signal and/or terminal location information as the downlink beam information;
  the sending the beam information to a network side device, includes:
  sending the downlink beam information to the network side device, the downlink beam information being used for the network side device to obtain terminal location information and/or beam quality information for beam management from the downlink beam information.

An embodiment of the present application provides an apparatus for beam management, where the apparatus for beam management is applied to a network side device, and includes:
  a receiving device, configured to receive beam information for beam management sent by a terminal, where the beam information includes uplink beam information or downlink beam information;
  a determining device, configured to determine specified information for beam management according to the beam information, where the specified information includes terminal location information and/or beam quality information; and
  a beam managing device, configured to determine transmission beams for signal transmission and/or a change trend of transmission beam according to the specified information and network deployment information, where the signal transmission includes uplink signal transmission or downlink signal transmission.

An embodiment of the present application provides an apparatus for beam management, where the beam management apparatus is applied to a terminal, and includes: an information determining device, configured to determine beam information for beam management, where the beam information includes uplink beam information or downlink beam information; and
  an information sending device, configured to send the beam information to a network side device for indicating the terminal to determine specified information for beam management according to the beam information, and determine transmission beams for signal transmission and/or a change trend of transmission beam according to the specified information and network deployment information; where the specified information includes terminal location information and/or beam quality information, and the signal transmission includes uplink signal transmission or downlink signal transmission.

An embodiment of the present application provides a network side device, including a processor, and a memory storing a program that is executable on the processor, where the program, when executed by the processor, causes the processor to perform the following steps:

receiving beam information for beam management sent by a terminal, where the beam information includes uplink beam information or downlink beam information;

determining specified information for beam management according to the beam information, where the specified information includes terminal location information and/or beam quality information; and determining transmission beams for signal transmission and/or a change trend of transmission beam according to the specified information and network deployment information, where the signal transmission includes uplink signal transmission or downlink signal transmission.

In one embodiment, the receiving beam information for beam management sent by a terminal, includes:

sending network side configuration information or indication information to the terminal, where the network side configuration information or indication information is used for indicating the terminal to send an uplink signal for beam quality measurement; and receiving the uplink beam information sent by the terminal, where the uplink beam information includes the uplink signal and/or terminal location information.

In one embodiment, the determining specified information for beam management according to the beam information, includes:

measuring the quality of the uplink signal in the uplink beam information to obtain beam quality information corresponding to the uplink signal;

determining the beam quality information corresponding to the uplink signal as beam quality information for beam management; and determining the terminal location information reported by the terminal as the terminal location information for beam management.

In one embodiment, the receiving beam information for beam management sent by a terminal, includes:

sending a downlink signal for beam quality measurement to the terminal, the downlink signal is used for indicating the terminal to measure the quality of the downlink signal to obtain beam quality information corresponding to the downlink signal; and receiving the downlink beam information reported by the terminal, where the downlink beam information includes beam quality information corresponding to the downlink signal and/or terminal location information.

In one embodiment, the determining specified information for beam management according to the beam information, includes:

determining the beam quality information corresponding to the downlink signal as beam quality information for beam management; and determining the terminal location information reported by the terminal as the terminal location information for beam management; or determining the terminal location information for beam management according to the beam quality information reported by the terminal.

In one embodiment, the terminal location information is a location identifier determined by the terminal according to a rule pre-agreed with the network side; where the location identifier is obtained by positioning of a global positioning system (GPS) of the terminal.

In one embodiment, the terminal location information is angle information of a channel through which the downlink signal passes, and the angle information is used to determine the location of the terminal.

In one embodiment, the network deployment information includes one or more of line map information, beam information covered by the line, network antenna configuration, network topology, beam distribution information or beam location information;

where the beam information covered by the line includes one or more of an optimal beam, a change trend of beam or a change trend of beam quality at each position along the line in different moving directions.

In one embodiment, the network deployment information is pre-stored on the network side device or a cloud device.

In one embodiment, the network deployment information is determined by the network side device according to the beam information reported by all terminals in a specified area within a specified time period, and the location information of all the terminals in the specified area within a specified time period.

In one embodiment, the determining transmission beams for signal transmission and/or change trend of transmission beam according to the specified information and network deployment information, includes:

determining a location of the terminal according to the terminal location information;

determining network deployment information of the line where the terminal is located according to the location of the terminal; and determining transmission beams for signal transmission and/or change trend of transmission beam according to the network deployment information of the line where the terminal is located and the beam quality information.

In one embodiment, determining transmission beams for signal transmission and/or change trend of transmission beam according to the specified information and network deployment information, includes:

determining a moving direction of the terminal according to the terminal location information; and determining transmission beams for signal transmission and/or the change trend of transmission beam according to the moving direction of the terminal and the network deployment information.

An embodiment of the present application provides a terminal, including a processor, and a memory storing a program that is executable on the processor, where the program, when executed by the processor, causes the processor to perform the following steps:

determining beam information for beam management, where the beam information includes uplink beam information or downlink beam information; and sending the beam information to a network side device for indicating the network side device to determine specified information for beam management according to the beam information, and determine transmission beams for signal transmission and/or change trend of transmission beam according to the specified information and network deployment information;

the specified information includes terminal location information and/or beam quality information, and the signal transmission includes uplink signal transmission or downlink signal transmission.

In one embodiment, the determining beam information for beam management, includes:

receiving network side configuration information or indication information sent by the network side device, where the network side configuration information or indication information is used for indicating the terminal to send an uplink signal for beam quality measurement; and determining the uplink signal and/or terminal location information as the uplink beam information;

the sending the beam information to a network side device, includes:

sending the uplink beam information to the network side device for indicating the network side device to measure the quality of the uplink signal in the uplink beam information at the network side device to obtain beam quality information corresponding to the uplink signal, where the beam quality information corresponding to the uplink signal is the beam quality information for beam management.

In one embodiment, the determining beam information for beam management, includes:

receiving downlink signal for beam quality measurement sent by the network side device;

measuring the quality of the downlink signal to obtain the beam quality information corresponding to the downlink signal; and determining the beam quality information corresponding to the downlink signal and/or terminal location information as the downlink beam information;

the sending the beam information to a network side device, includes:

sending the downlink beam information to the network side device, the downlink beam information being used for the network device to obtain terminal location information and/or beam quality information for beam management from the downlink beam information.

An embodiment of the present application provides a non-transitory computer-readable storage medium storing a computer program that, when executed by a processor, causes the processor to perform the steps of the method for beam management by a network side device.

An embodiment of the present application provides a non-transitory computer-readable storage medium storing a computer program, that, when executed by a processor, causes the processor to perform the steps of the method for beam management by a terminal.

The embodiments of the present application provide a method and an apparatus for beam management, a network side device, a terminal and a storage medium. According to the embodiments of the application, by determining specified information for beam management, where the specified information includes terminal location information and/or beam quality information, and determining transmission beams for signal transmission and/or trend of transmission beam change according to the terminal location information and/or beam quality information and network deployment information, the great overhead and delay problems caused by the frequent beam sweeping process in high-speed occasions can be solved, the beam management strategy can be optimized and beam sweeping time and beam overhead can be saved.

BRIEF DESCRIPTION OF THE DRAWINGS

In order to more clearly illustrate the solutions of the embodiments of the present application, the following will briefly introduce the accompanying drawings used in describing the embodiments. The accompanying drawings in the following description are only some embodiments of the present application, and other drawings can also be obtained based on these drawings.

DETAILED DESCRIPTION

Figure 1:
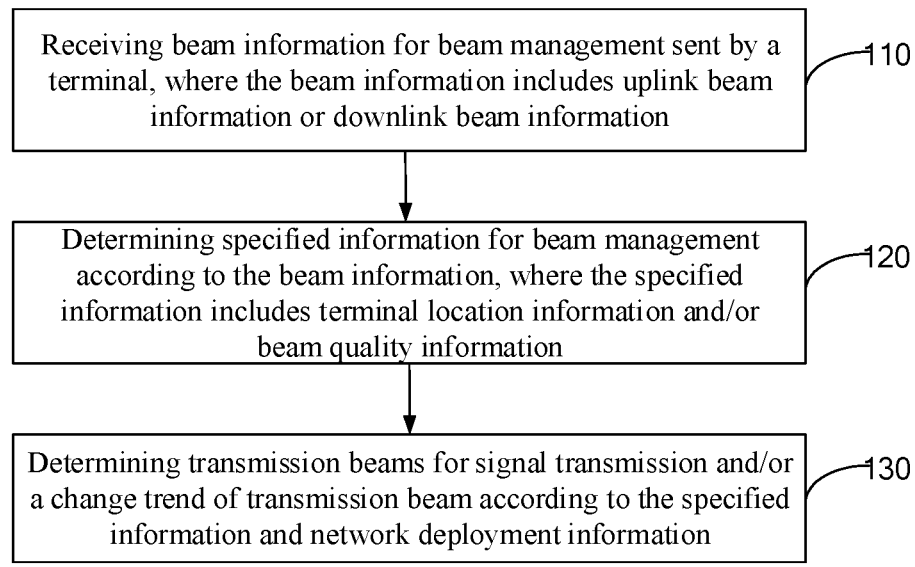
FIG. 1 is a schematic flowchart of a method for beam management according to an embodiment of the present application.

In order to make the embodiments of the present application clearer, the solutions in the embodiments of the present application will be described clearly and completely below with reference to the drawings in the embodiments of the present application. The described embodiments it is a part of the embodiments of the present application, rather than all of the embodiments.

In order to clearly describe the solutions of the embodiments of the present application, in each embodiment of the present application, if words such as "first" and "second" are used to distinguish the identical or similar items with basically the same function and effect, words such as "first" and "second" do not limit the quantity and execution order.

With the increasing scarcity of low-frequency resources, the millimeter wave band has more spectrum resources, which can provide greater bandwidth and become an important band for future applications of mobile communication systems. The millimeter wave band has different propagation characteristics from the traditional low-frequency spectrum because of having shorter wavelength, such as higher propagation loss, poor reflection and diffraction performance and the like. Therefore, larger-scale antenna arrays are usually adopted to form beams with greater gain, which can overcome propagation loss and ensure system coverage. For millimeter wave antenna arrays, due to having shorter wavelength, smaller spacing between antenna elements and smaller apertures, more physical antenna elements can be integrated into a two-dimensional antenna array with limited size; meanwhile, due to the limited size of millimeter wave antenna arrays, considering factors such as hardware complexity, cost overhead, power consumption and the like, the digital beamforming method adopted in the low frequency band cannot be used, thus a hybrid beamforming method combining analog beams and limited digital ports is usually used.

For a multi-antenna array, each antenna has an independent RF link channel, but still shares the same digital link channel. Each RF link allows independent amplitude and phase adjustment to the transmitted signal, and the formed beam is mainly achieved by phase and amplitude adjustments in the RF channel, which is called analog beamforming signal. In contrast, for a full-digital beamforming antenna array, each antenna has an independent digital link channel, by which the amplitude and phase of each signal can be controlled at the baseband.

At present, in high-frequency transmission systems, beamforming transmission can be adopted to provide higher beamforming gain and greater coverage. A base station or a terminal usually obtains a suboptimal beamforming direction by beam sweeping. In the beam sweeping, suboptimal beamforming directions are obtained by measuring signals in different beam directions. The process of beam sweeping usually includes processes such as sending reference signals in different beam directions, performing signal quality measurement, performing beam selection.

However, for the traditional beam sweeping technology, in order to obtain optimal beams in multiple beam directions, it is necessary to send reference signals in multiple beam directions respectively, and select the optimal beams by performing the signal quality measurement respectively. The greater the number of antennas, the stronger the directivity of the beam, and the greater the number of beam directions, the greater the number of reference signals required, the greater the overhead, and the higher the computational complexity. Therefore, how to perform low-overhead and low-complexity beam sweeping is an urgent problem to be solved in the occasion of deploying ultra-large-scale antennas.

Since the phase of a signal sent by each antenna is generally changed by a phase shifter during analog beamforming, the analog beamforming is performed over the entire bandwidth because of the limitation of device capabilities, unlike digital beamforming, which can be performed separately for some sub bands. Therefore, the analog beamforming needs to be multiplexed through time division multiplexing (TDM). Multiple beam directions mean that beam sweeping takes a long time. In high-speed moving occasions, the channel environment changes rapidly, and the optimal beam direction and service sites also change rapidly. If the traditional beam sweeping technology is still adopted, the changes of the beam may not be tracked in time, resulting in beam failure or wireless link failure, which will affect performance.

In view of the above problems, the embodiments of the present application provide a method and an apparatus for beam management, a network side device, a terminal, and a storage medium, to reduce the time and overhead of beam sweeping.

The method and apparatus for beam management, network side device, terminal, and storage medium according to the embodiments of the present application can be applied to a wireless communication system or a system combining wireless and wired, which includes, but not limited to, 5G systems (such as NR systems), 6G systems, satellite systems, interne of vehicles systems, long term evolution (LTE) systems, subsequent evolution communication systems of the above systems and so on.

The network side devices according to the embodiments of the present application may include, but not limited to, one or more of the following: commonly used base stations, evolved node base stations (eNB), and network side devices (for example, next generation node base stations (gNB), transmission and reception points (TRP) and other devices in 5G systems.

The terminals according to the embodiments of the present application may be referred to user equipment and the like. The terminals include, but not limited to, handheld devices and vehicle-mounted devices. For example, the terminals may be a mobile phone, a tablet computer, a notebook computer, an ultra-mobile personal computer (UMPC), a netbook, a personal digital assistant (PDA) and the like.

The following description will be given through specific embodiments.

FIG. 1 is a flowchart of a method for beam management according to an embodiment of the present application, and the method may be used by a network side device, such as a base station. As shown in FIG. 1, the method includes the following steps.

In step 110, beam information for beam management sent by a terminal is received, and the beam information includes uplink beam information or downlink beam information.

In one embodiment, the uplink beam information may refer to the information obtained by using an uplink transmission mode. For example, an uplink signal for beam quality measurement sent by the terminal according to the configuration or instruction of the network side device.

The downlink beam information may refer to the information obtained by using a downlink transmission mode. For example, beam quality information corresponding to the downlink signal is obtained by the terminal based on the measurement of the downlink signal sent by the network side device.

In step 120, specified information for beam management is determined according to the beam information, where the specified information includes terminal location information and/or beam quality information. Herein, the beam quality information may include beam identification information.

When performing beam management, terminal location information and beam quality information are optional, but at least one of them must be selected.

In a certain case, the terminal location information can be obtained according to the beam quality information, or the beam quality information includes the terminal location information, then the beam quality information is necessary information, while the terminal location information is optional information in this case. In addition, if the suboptimal beam can be determined only by the terminal location information and network deployment information without requiring the beam quality information, then the terminal location information is necessary information, and the beam quality information is optional information in this case. Herein the suboptimal beam may be transmission beams for signal transmission.

In step 130, transmission beams for signal transmission and/or a change trend of transmission beam are determined according to the specified information and network deployment information. Herein the signal transmission includes uplink signal transmission or downlink signal transmission.

In one embodiment, the transmission beams may be suboptimal beams determined according to the specified information and network deployment information. In addition, the change trend of transmission beam may be a change in the beam quality of a possible beam at the location of the terminal, or a possible beam change in the direction of subsequent movement of the terminal, or may include one or suboptimal beams at different locations on the subsequent moving trajectory of the terminal.

Number of determined transmission beams may be one or more. The determined transmission beams may be the same as or different from the transmission beam used in the previous signal transmission.

In addition, the network deployment information may include road or rail information and the like. Activities of users on them are limited to the rules of rails or roads, and their motion trajectories also have certain regularity since rails and roads have certain regular distribution in high-speed moving occasions such as rail traffic or urban road traffic. The certainty of the user motion trajectory will bring regular changes of beam measurement information and regularity of beam handover. The beam management strategy can be optimized by using this rule and the location information of the users to save beam sweeping time and beam overhead.

By determining specified information for beam management, where the specified information includes terminal location information and/or beam quality information, and determining transmission beams for signal transmission and/or the change trend of transmission beam according to the terminal location information and/or beam quality information and network deployment information, the great overhead and delay problems caused by the frequent beam sweeping process in high-speed occasions are solved, the beam management strategy is optimized and beam sweeping time and beam overhead are saved.

Further, based on the above methods, the receiving of beam information for beam management sent by a terminal in the step 110 can be performed by the following schemes, which are not limited thereto.

In (1-1-1), network side configuration information or indication information is sent to the terminal, and the network side configuration information or indication information is used for indicating the terminal to send an uplink signal for beam quality measurement.

In one embodiment, there may be many kinds of uplink signals for beam quality measurement, for example: a sounding reference signal (SRS), physical random-access channel (PRACH) and the like.

In (1-1-2), the uplink signal and/or terminal location information sent by the terminal is received.

The determining of specified information for beam management according to the beam information in the step 120 can be performed by the following schemes, which are not limited thereto.

In (1-1-3), the quality of the uplink signal in the uplink beam information is measured, to obtain beam quality information corresponding to the uplink signal.

The network side device can obtain beam quality information corresponding to one or more beams in the uplink signal by measuring the quality of the uplink signal. The beam quality information may include measured reference signal quality information and/or beam identifiers, uplink signal identifiers and the like as required. The reference signal quality information here may be reference signal receiving power (RSRP), block error rate (BLER) and the like.

In (1-1-4), the beam quality information corresponding to the uplink signal is determined as beam quality information for beam management.

In (1-1-5), the terminal location information reported by the terminal is determined as the terminal location information for beam management.

By indicating the terminal to send an uplink signal for beam quality measurement, and measuring the quality of the uplink signal, the beam quality information corresponding to the uplink signal is obtained, and then the transmission beam for signal transmission and/or the change trend of transmission beam is determined according to the beam quality information and the network deployment information, and g beam sweeping time and beam overhead are saved, and the time delay caused by the beam sweeping process is reduced.

Further, based on the above methods, the receiving of beam information for beam management sent by a terminal in the step 110 can be performed by the following schemes, which are not limited thereto.

In (1-2-1), a downlink signal for beam quality measurement is sent to the terminal, and the terminal can measure the quality of the downlink signal to obtain beam quality information corresponding to the downlink signal.

There may be many kinds of downlink signals for beam quality measurement, for example: channel state indication-reference signal (CSI-RS) and the like.

The terminal can obtain beam quality information corresponding to one or more beams in the downlink signal by measuring the quality of the downlink signal.

Herein, the beam quality information may include measured reference signal quality information and/or beam identifiers, uplink signal identifiers and the like as required. The reference signal quality information here may be RSRP, BLER and the like.

In (1-2-2), the downlink beam information reported by the terminal is received, where the downlink beam information includes beam quality information corresponding to the downlink signal and/or terminal location information.

The determining of specified information for beam management according to the beam information in the step 120 can be performed by the following schemes, which are not limited thereto.

In (1-2-3), the beam quality information corresponding to the downlink signal is determined as beam quality information for beam management;

In (1-2-4), the terminal location information reported by the terminal is determined as the terminal location information for beam management; or the terminal location information for beam management is determined according to the beam quality information reported by the terminal.

In one embodiment, the terminal location information can be obtained by calculating according to the beam quality information reported by the terminal through the network side; it can also be reported through the terminal; it can further be obtained by other means, for example: from real-time reported information between the terminal and the network side during the communication, instead of obtaining from the beam management process.

By sending a downlink signal for beam quality measurement to the terminal and receiving the downlink beam information reported by the terminal, the downlink beam information includes beam quality information corresponding to the downlink signal and/or terminal location information, and then the transmission beam for signal transmission and/or the change trend of the transmission beam is determined according to the beam quality information and the network deployment information, beam sweeping time and beam overhead are saved, and the time delay caused by the beam sweeping process is reduced.

Further, based on the above methods, the terminal location information reported by the terminal may be a location identifier determined by the terminal according to the rule pre-agreed with the network side. Herein the location identifier is obtained by positioning of global positioning system (GPS) of the terminal.

In one embodiment, if the plane space where the cell is located is divided into spatial grids each having an area of S, each spatial grid is assigned a unique zone ID, and the zone ID of the location is determined by GPS positioning information.

Further, on the basis of the above methods, the terminal location information reported by the terminal may be angle information of a channel through which the downlink signal passes, and the angle information is used to determine the location of the terminal.

The angle information may be azimuth angle of departure (AOD) and the like. The network side can determine the location of the terminal according to the angle information.

In the above embodiments, the terminal location information may be a zone ID or angle information, and the network side can determine the location of the terminal according to the angle information, the representation of terminal location information is enriched and applied scope of beam management is expanded.

Further, based on the above method, the network deployment information in the step 130 may include one or more of line map information, beam information covered by the line, network antenna configuration, network topology, beam distribution information or beam location information;
where the beam information covered by the line includes one or more of an optimal beam, a change trend of beam or a change trend of beam quality at each position along the line in different moving directions. In one embodiment, the network deployment information is pre-stored on the network side device or a cloud device.

In one embodiment, the network deployment information can be updated periodically or aperiodically as required. If it is rail or road information, it can be updated when the road or track information changes (such as when the network changes). If it is network deployment information determined according to the pre-collected historical information of multiple terminals, it can be updated when new information reported by a predefined terminal is obtained at a predefined defined time as required. This predefined time can be any time, or periodic certain time and the predefined terminal can be any terminal, or eligible certain terminal. For example, the network deployment information can be updated using the information reported by the terminal when the location information reported by the terminal is new location information (location information not collected by the pre-stored trajectory information).

The network deployment information can be pre-stored on the network side device or the cloud device, and can also be updated periodically or aperiodically, the accuracy and real-time capability of the network deployment information is ensured, which improves the performance of beam management.

Further, on the basis of the above method, the network deployment information in the step 130 may be determined by the network side device according to the beam information reported by all terminals in a specified area within a specified time period, and the location information of all the terminals in the specified area within a specified time period.

In one embodiment, the network deployment information obtained by the network can also be determined from the beam information reported by all terminals served by the network and the obtained location information collected by the network (base station) within a period of time (the corresponding uplink process is: determining from the beam information of all terminals and the obtained location information of the terminals measured by the network within a period of time). The moving lines of the terminal determined according to the location information of the terminal obtained within a certain period of time correspond to the road or track line information one by one, and the beam situation of coverage along the lines is determined in combination with the beam information reported by the terminal within a certain period of time.

The network deployment information may be determined by the network side device according to the beam information reported by all terminals in a specified area within a specified time period, and the location information of all the terminals in the specified area within a specified time period, which ensures the accuracy of the network deployment information.

Further, on the basis of the above methods, the determining of transmission beams for signal transmission and/or change trend of transmission beam according to the specified information and network deployment information in the step 130 can be performed by the following schemes, which are not limited thereto.

In (1-4-1), the location of the terminal is determined according to the terminal location information.

In (1-4-2), the network deployment information of the line where the terminal is located is determined according to the location of the terminal;

In (1-4-3), transmission beams for signal transmission and/or the change trend of transmission beam are determined according to the network deployment information of the line where the terminal is located and the beam quality information.

The network side device determines the network deployment information of the line where the terminal is located according to the location of the terminal, and determines the possible optimal beam or a change trend of beam (or a change trend of beam quality) in each moving direction of the location of the terminal according to the network deployment information, and further determines a suboptimal beam or suboptimal beam change information corresponding to the beam information according to the beam information.

By determining the location of the terminal according to the terminal location information; determining the network deployment information of the line where the terminal is located according to the location of the terminal; determining transmission beams for signal transmission and/or the change trend of transmission beam according to the network deployment information of the line where the terminal is located and the beam quality information. In such a way, the network side device obtains network deployment information in advance, and then a suboptimal beam can be obtained according to the measurement information of the terminal on limited beams without performing sweeping on all beams for each terminal, the beam management strategy is further optimized and beam sweeping time and beam overhead are saved.

Further, on the basis of the above methods, the determining of transmission beams for signal transmission and/or the change trend of transmission beam according to the specified information and network deployment information in the step 130 can be performed by the following schemes, which are not limited thereto.

In (1-5-1), moving direction of the terminal is determined according to the terminal location information.

In (1-5-2), transmission beams for signal transmission and/or the change trend of transmission beam are determined according to the moving direction of the terminal and the network deployment information.

In one embodiment, the network side device may determine the moving direction of the terminal according to the location information reported by the terminal multiple times, and determine transmission beams for signal transmission and/or the change trend of transmission beam in combination with the moving direction of the terminal, newly reported location information and the network deployment information.

In addition, the network side can determine one or more beams for measurement according to the geographical location of the terminal, and further obtain the moving direction of the terminal according to the measured result, and obtain the transmission beam for signal transmission and/or the change trend of transmission beam based on the location and moving direction of the terminal.

In one embodiment, the network side estimates a moving speed and a moving direction of the terminal according to the location information and time difference reported by the terminal multiple times, and pre-determines the measurement and handover behaviors of the transmission beam for signal transmission during the moving process of the terminal according to the information such as the location, the moving speed, and direction of the terminal and the like.

In one embodiment, the network side positions the location of the terminal according to the beam quality information reported by the terminal, determines the moving direction of the terminal, and obtains transmission beams for signal transmission according to the moving direction and position of the terminal. For example, the optimal beam for downlink signal transmission.

By determining moving direction of the terminal according to the terminal location information, and determining transmission beams for signal transmission and/or the change trend of transmission beam according to the moving direction of the terminal and the network deployment information, the network side device obtains network deployment information in advance, and then can obtain a suboptimal beam according to the measurement information of limited beams by the terminal without performing sweeping on all beams for each terminal, the beam management strategy is further optimized and the efficiency and practicability of beam management are improved.

Figure 2:
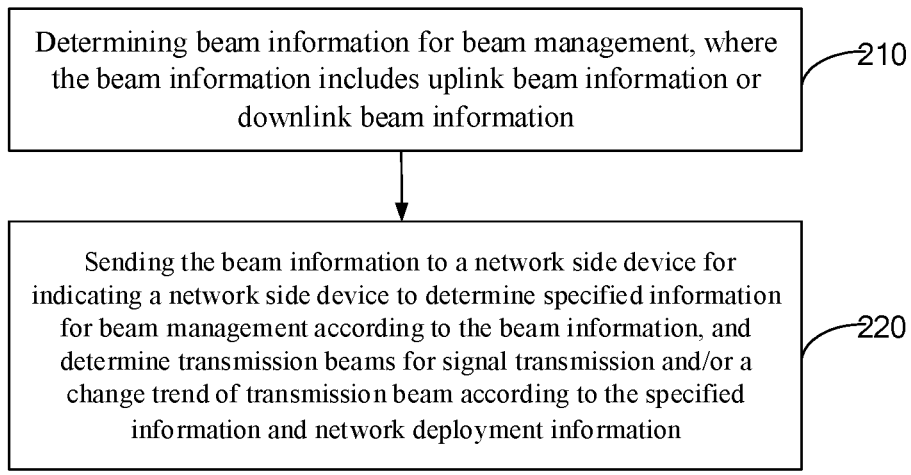
FIG. 2 is a schematic flowchart of a method for beam management according to an embodiment of the present application.

FIG. 2 is a flowchart of a method for beam management according to an embodiment of the present application, and the method may be used for a terminal; as shown in FIG. 2, the method includes the following steps.

In step 210, beam information for beam management is determined, where the beam information includes uplink beam information or downlink beam information.

In one embodiment, the uplink beam information may refer to the information obtained by a mode for uplink transmission; for example: an uplink signal for beam quality measurement sent by the terminal according to the configuration or instruction of the network side device.

The downlink beam information may refer to the information obtained by a mode for downlink transmission; for example: the terminal performs measurement according to the downlink signal sent by the network side device to obtain beam quality information corresponding to the downlink signal.

In step 220, the beam information is sent to the network side device, for indicating the network side device to determine specified information for beam management according to the beam information, and determine transmission beams for signal transmission and/or change trend of transmission beam according to the specified information and network deployment information.

The specified information includes terminal location information and/or beam quality information, and the signal transmission includes uplink signal transmission or downlink signal transmission.

In one embodiment, the transmission beams may be suboptimal beams determined according to the specified information and network deployment information. In addition, the change trend of transmission beam may be a change in the beam quality of a possible beam at the location of the terminal, or a possible beam change in the direction of subsequent movement of the terminal, or may include one or more suboptimal beams at different locations on the subsequent moving trajectory of the terminal.

The number of determined transmission beams may be one or more. The determined transmission beams may be the same as or different from the transmission beam used in the previous signal transmission.

By determining beam information for beam management, where the beam information includes uplink beam information or downlink beam information, and sending the beam information to a network side device, the network side device can determine specified information for beam management according to the beam information, and determines transmission beams for signal transmission and/or the change trend of transmission beam according to the specified information and network deployment information, the problem of high overhead and time delay caused by the frequent beam sweeping process in high-speed occasions is solved, the beam management strategy is optimized, and beam sweeping time and beam overhead are saved.

Further, on the basis of the above methods, the determining of beam information for beam management in the step 210 can be performed by the following schemes, which are not limited thereto.

In (2-1-1), network side configuration information or indication information sent by the network side device is received, and the network side configuration information or indication information is used for indicating the terminal to send an uplink signal for beam quality measurement.

In one embodiment, there may be many kinds of uplink signals for beam quality measurement. For example, SRS, PRACH and the like.

In (2-1-2), the uplink signal and/or terminal location information are determined as the uplink beam information.

The sending the beam information to a network side device in the step 220 can be performed by the following schemes, which are not limited thereto.

In (2-1-3), the uplink beam information is sent to the network side device, and the network side device can measure the quality of the uplink signal in the uplink beam information, and obtain beam quality information corresponding to the uplink signal, the beam quality information corresponding to the uplink signal being the beam quality information for beam management.

The network side device can obtain beam quality information corresponding to one or more beams in the uplink signal by measuring the quality of the uplink signal. The beam quality information may include measured reference signal quality information and/or beam identifiers, uplink signal identifiers and the like as required. The reference signal quality information here may be RSRP, BLER and the like.

By sending the uplink beam information to the network side device, the network side device can measure the quality of the uplink signal to obtain beam quality information corresponding to the uplink signal, and determine transmission beams for signal transmission and/or the change trend of transmission beam according to the beam quality information and network deployment information, and beam sweeping time and beam overhead are saved.

Further, on the basis of the above methods, the determining of beam information for beam management in the step 210 can be performed by the following schemes, which are not limited thereto.

In (2-2-1), a downlink signal for beam quality measurement sent by the network side device is received.

There may be many kinds of downlink signals for beam quality measurement, for example: CSI-RS and the like.

In (2-2-2), the quality of the downlink signal is measured to obtain the beam quality information corresponding to the downlink signal.

The terminal measures the quality of the downlink signal to obtain beam quality information corresponding to one or more beams in the downlink signal.

Herein, the beam quality information may include measured reference signal quality information and/or beam identifiers, uplink signal identifiers and the like as required. The reference signal quality information here may be RSRP, BLER and the like.

In (2-2-3), the beam quality information corresponding to the downlink signal and/or terminal location information is determined as the downlink beam information.

Correspondingly, sending the beam information to a network side device in the step 220 can be performed by the following schemes, which are not limited thereto.

In (2-2-4), the downlink beam information is sent to the network side device, and the network side device obtains terminal location information and/or beam quality information for beam management from the downlink beam information.

The terminal location information can be obtained by calculating from the beam quality information reported by the terminal through the network side; it can also be reported through the terminal; it can further be obtained by other means, for example: from real-time reported information between the terminal and the network side during the communication, instead of obtaining from the beam management process.

By receiving downlink signal for beam quality measurement sent by the network side device, measuring the quality of the downlink signal, to obtain the beam quality information corresponding to the downlink signal, and determining the beam quality information corresponding to the downlink signal and/or terminal location information as the downlink beam information, and sending the downlink beam information to the network side device, the network side device can obtain terminal location information and/or beam quality information for beam management from the downlink beam information, and then determine transmission beams for signal transmission and/or the change trend of transmission beam according to the beam quality information and network deployment information, and beam sweeping time and beam overhead are saved.

The methods for beam management shown in FIG. 1 and FIG. 2 will be described below with specific examples.

Example 1: A Beam Management Scheme Based on Location Information

The network side divides the served cell into multiple spatial grids with a horizontal area of 40 m×40 m, and each spatial grid is assigned a unique zone identifier (zone ID). The specific steps of example 1 are as follows.

S1: the network side (base station) obtains network deployment information. The process of obtaining network deployment information comprises: collecting, by the base station, the beam quality information (such as RSRP and CRS-RI and the like) reported by all users in the cell and the zone ID of the terminals, analyzing the CRS-RI, RSRP, and zone ID reported by different terminals, determining the moving lines of different users and the beam coverage along the lines, and storing the above information (that is, trajectory information) in the network. In one embodiment, the base station only collects beam quality information reported by users within a period of time.

S2: the terminal monitors the beam quality of the reference signal (such as CSI-RS) used for beam information measurement according to the configuration or instruction of the base station, and reports the beam quality information (such as RSRP and CRS-RI) and zone ID to the network side (base station), where the beam quality information is obtained from a measurement result of a downlink reference signal, and the zone ID is calculated from the GPS positioning information according to the spatial grid division rules predefined by the network.

S3: the network side (base station) determines the current recommended sending beam of the terminal according to the beam quality information (CRS-RI and RSRP) and the zone ID reported by the terminal in combination with the network deployment information. The specific process comprises: positioning, by the network side (base station), the line where the terminal is located according to the location information reported by the terminal, and determines beams that may be available for the terminal or a change trend of the beam when the terminal moves in all possible directions (such as track or road crossing, determined by lines, generally two directions) at the location according to the beam coverage along the lines known to the network, and determining a suboptimal beam or a change trend of the suboptimal beam corresponding to the beam quality information among the above available beams or the change trend of the beam according to the beam quality information reported by the terminal.

Example 2: A Beam Management Scheme Based on Position and Trajectory Information For some high-speed moving occasions, the motion trajectory of the users is fixed, the beam distribution and coverage on the same trajectory are determined, the moving directions of the users are different, and the beam handover orders are different. At this time, the behavior of the users can be predicted according to the trajectory information pre-stored in the base station, and beam management is performed to save overhead. The network side divides the served cell into multiple spatial grids with a horizontal area of 40 m×40 m, and each spatial grid is assigned a unique location identifier (zone ID). The specific scheme is as follows.

S1: the network (base station) pre-stores network deployment information. The network deployment information includes line (rail or road) map information and beam coverage information along the line (including optimal beams in different motion directions of each position along the line, beam distribution information or location information, the change trend of beam and the like), which is obtained from network design and track or road design (map) information.

S2: the terminal monitors the quality (such as RSRP) of the reference signal (such as CRS, CSI-RS and the like) used for beam information measurement according to the configuration or instruction of the base station, and reports one or more beam quality information (such as RSRP and CRS-RI) which meets certain quality requirements and the zone ID of the terminal to the base station. The beam quality information is obtained from a measurement result of the downlink reference signal. In one embodiment, the zone ID is calculated by the GPS positioning information according to the spatial grid division rules predefined by the network.

S3: the base station determines M (M≥1) suboptimal transmission beams corresponding to the beam quality information according to the beam quality information reported by the terminal and the zone ID in combination with the network deployment information. The specific process comprises: finding, by the network side (base station), the line where the terminal is located according to the location information reported by the terminal, and determining a suboptimal beam corresponding to the beam quality information or a change trend of the suboptimal beam according to the beam coverage along the lines in combination with the beam quality information reported by the terminal. In one embodiment, the base station stores the beam quality information reported by the terminal and the zone ID locally.

S4: the base station sends a reference signal on the above suboptimal beams, and indicates it to the terminal.

S5: S2 is repeated.

S6: the base station receives the beam quality information and the location information (zone ID) of the terminal reported by the terminal, and stores them locally. The base station determines the moving direction or moving trajectory of the terminal according to the zone ID reported twice by the terminal, and determines N (1≤N<M) suboptimal beams corresponding to the beam information newly reported by the terminal in combination with the network deployment information.

Example 3: A Beam Prediction Scheme Based on Location and Velocity

For some high-speed moving occasions, the motion trajectory of the users is fixed, the beam distribution and coverage on the same trajectory are determined, the moving directions of the users are different, and the beam handover orders are different. At this time, the behavior of the users can be predicted according to the trajectory information pre-stored in the base station, and beam management is performed to achieve the purpose of saving overhead. The network side divides the served cell into multiple spatial grids with a horizontal area of 40 m×40 m, and each spatial grid is assigned a unique location identifier (zone ID). The specific scheme is as follows.

S1: the network (base station) pre-stores network deployment information. The network deployment information includes line (rail or road) map information and beam coverage information along the line, which is obtained from network design and track or road design (map) information.

S2: the terminal monitors the quality (such as RSRP) of the reference signal (such as CRS, CSI-RS and the like) used for beam information measurement according to the configuration or instruction of the base station, and reports one or more beam quality information (such as RSRP and CRS-RI) with the best beam quality and the zone ID of the terminal to the base station. The beam quality information is obtained from a measurement result of the downlink reference signal, and the zone ID is calculated by the GPS positioning information according to the spatial grid division rules predefined by the network.

S3: the base station stores the beam quality information reported by the terminal and the zone ID locally, and determines M (M≥1) suboptimal transmission beams corresponding to the beam quality information in combination with the network deployment information. The specific process comprises: finding, by the network side (base station), the line where the terminal is located according to the location information reported by the terminal, and determines a suboptimal beam or a change trend of the suboptimal beam corresponding to the beam quality information according to the beam coverage along the lines in combination with the beam quality information reported by the terminal.

S4: the base station sends a reference signal on the above suboptimal beams, and indicates it to the terminal.

S5: S2 is repeated.

S6: the base station receives the beam quality information and the location information (zone ID) of the terminal reported by the terminal. The base station estimates the moving speed and direction of the terminal according to the location information reported twice by the terminal and the time difference between the reports, and predicts the moving trajectory and arrival time within a predefined period of time T in combination with the line map information in the network deployment information and the beam coverage along the line, and predicts the suboptimal beams at each position along the moving trajectory of the terminal or change trends of the suboptimal beams and the handover time nodes of the suboptimal beams. In one embodiment, the base station stores the beam quality information reported by the terminal and the zone ID of the terminal locally.

Example 4: An Uplink Beam Determining Scheme Based on Location and Trajectory Information For some high-speed moving occasions, the motion trajectory of the users is fixed, the beam distribution and coverage on the same trajectory are determined, the moving directions of the users are different, and the beam handover orders are different. At this time, the behavior of the users can be predicted according to the trajectory information pre-stored in the base station, and beam management is performed to save overhead. Assuming that the uplink reference signal of the system is SRS, the beam identifier is CRI, and the SRS is the quality indicator with RSRP as a reference signal. The network side divides the served cell into multiple spatial grids with a horizontal area of 40 m×40 m, and each spatial grid is assigned a unique location identifier zone ID. The specific scheme is as follows.

S1: the network (base station) pre-stores network deployment information. The network deployment information includes line (track or road) map information and beam coverage information along the line (including optimal beams in different motion directions of each position along the line, beam distribution information or location information, a change trend of beam and the like), which is obtained from network design and track or road design (map) information.

S2: the base station configures or indicates the terminal to send an uplink reference signal (SRS) for beam quality measurement, and the terminal sends the SRS, CRI and zone ID to the network side. In one embodiment, the zone ID is calculated by the GPS positioning information according to the spatial grid division rules predefined by the network.

S3: the base station measures the RSRP of the SRS, and determines the beam quality information (including the beam identifier and RSRP) corresponding to one or more signals in the uplink signal.

S4: the base station obtains the location information of the terminal, and combines the beam information and the location of the terminal with the network deployment information to determine suboptimal beams and/or the change trend of the suboptimal beam of downlink transmission (uplink transmission). The specific process includes finding, by the base station, the line where the terminal is located according to the location information of the terminal, and determines the suboptimal beams or a change trend of the suboptimal beam corresponding to the beam quality information according to the beam coverage along the lines in combination with the measured beam quality information.

Figure 3:
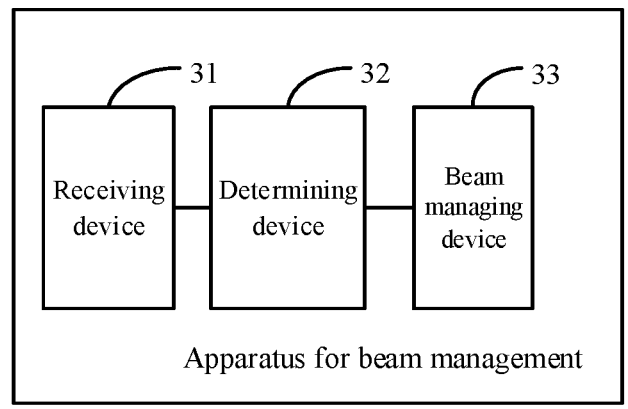
FIG. 3 is a block diagram of an apparatus for beam management according to an embodiment of the present application.

FIG. 3 is a block diagram of an apparatus for beam management according to an embodiment of the present application, and the beam management apparatus may be applied to a network side device; as shown in FIG. 3, the apparatus for beam management may include:

a receiving device 31, configured to receive beam information for beam management sent by a terminal, where the beam information includes uplink beam information or downlink beam information;

a determining device 32, configured to determine specified information for beam management according to the beam information, where the specified information includes terminal location information and/or beam quality information; and a beam managing device 33, configured to determine transmission beams for signal transmission and/or a change trend of transmission beam according to the specified information and network deployment information, where the signal transmission includes uplink signal transmission or downlink signal transmission.

Further, based on the above apparatus, the receiving device 31 may include:

a first sending subdevice, configured to send network side configuration information or indication information to the terminal, where the network side configuration information or indication information is used for indicating the terminal to send an uplink signal for beam quality measurement; and a first receiving subdevice, configured to receive the uplink beam information sent by the terminal, where the uplink beam information includes the uplink signal and/or terminal location information.

Further, based on the above apparatus, the determining device 32 may be configured for:

measuring the quality of the uplink signal in the uplink beam information to obtain beam quality information corresponding to the uplink signal;

determining the beam quality information corresponding to the uplink signal as beam quality information for beam management; and determining the terminal location information reported by the terminal as the terminal location information for beam management.

Further, based on the above apparatuses, the receiving device 31 may include: a second sending subdevice, configured to send a downlink signal for beam quality measurement to the terminal, and the terminal measures the quality of the downlink signal to obtain beam quality information corresponding to the downlink signal; and a second receiving subdevice is configured to receive the downlink beam information reported by the terminal, where the downlink beam information includes beam quality information corresponding to the downlink signal and/or terminal location information.

Further, based on the above apparatuses, the determining device 32 may be configured for:

determining the beam quality information corresponding to the downlink signal as beam quality information for beam management; and determining the terminal location information reported by the terminal as the terminal location information for beam management; or determining the terminal location information for beam management according to the beam quality information reported by the terminal.

Further, based on the above apparatuses, the terminal location information is a location identifier determined by the terminal according to a rule pre-agreed with the network side; where the location identifier is obtained by positioning of the global positioning system (GPS) of the terminal.

Further, based on the above apparatuses, the terminal location information is angle information of a channel through which the downlink signal passes, and the angle information is used to determine the location of the terminal.

Further, based on the above apparatuses, the network deployment information includes one or more of line map information, beam information covered by the line, network antenna configuration, network topology, beam distribution information or beam location information;

The beam information covered by the line includes one or more of an optimal beam, a change trend of beam or a change trend of beam quality at each position along the line in different moving directions.

Further, based on the above apparatuses, the network deployment information is pre-stored on the network side device or a cloud device.

Further, based on the above apparatuses, the network deployment information is determined by the network side device according to the beam information reported by all terminals in a specified area within a specified time period, and the location information of all the terminals in the specified area within a specified time period.

Further, based on the above apparatuses, the beam managing device 33 may be configured for:

determining a location of the terminal according to the terminal location information;

determining the network deployment information of the line where the terminal is located according to the location of the terminal; and determining transmission beams for signal transmission and/or the change trend of transmission beam according to the network deployment information of the line where the terminal is located and the beam quality information.

Further, based on the above apparatuses, the beam managing device 33 may be configured for:

determining moving direction of the terminal according to the terminal location information; and determining transmission beams for signal transmission and/or the change trend of transmission beam according to the moving direction of the terminal and the network deployment information.

The apparatus provided in this embodiment can implement all the method steps that can be implemented by the above method embodiments, and can achieve the same beneficial effects, then the same content and beneficial effects in this apparatus embodiment and the above method embodiments will not be described in detail here.

Figure 4:
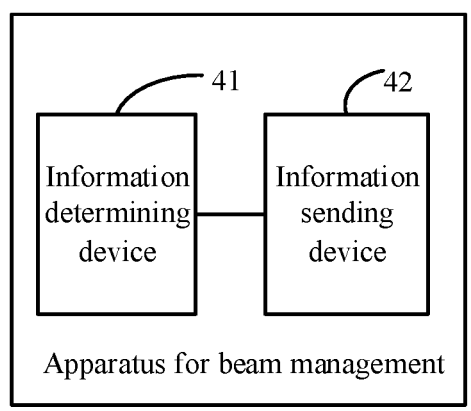
FIG. 4 is a block diagram of an apparatus for beam management according to an embodiment of the present application.

FIG. 4 is a block diagram of an apparatus for beam management according to an embodiment of the present application, and the apparatus for beam management may be applied to a terminal; as shown in FIG. 4, the apparatus for beam management may include:

an information determining device 41, configured to determine beam information for beam management, where the beam information includes uplink beam information or downlink beam information; and an information sending device 42, configured to send the beam information to a network side device, and the network side device determines specified information for beam management according to the beam information, and determines transmission beams for signal transmission and/or a change trend of transmission beam according to the specified information and network deployment information; where the specified information includes terminal location information and/or beam quality information, and the signal transmission includes uplink signal transmission or downlink signal transmission.

Further, based on the above apparatuses, the information determining device 41 may be configured for:

receiving network side configuration information or indication information sent by the network side device, where the network side configuration information or indication information is used for indicating the terminal to send an uplink signal for beam quality measurement; and determining the uplink signal and/or terminal location information as the uplink beam information;

the information sending device 42 may be configured for:

sending the uplink beam information to the network side device, and the network side device measures the quality of the uplink signal in the uplink beam information, and obtains beam quality information corresponding to the uplink signal, where the beam quality information corresponding to the uplink signal is the beam quality information for beam management.

Further, based on the above apparatuses, the information determining device 41 may be configured for:

receiving downlink signal for beam quality measurement sent by the network side device;

measuring the quality of the downlink signal to obtain the beam quality information corresponding to the downlink signal; and determining the beam quality information corresponding to the downlink signal and/or terminal location information as the downlink beam information; and the information sending device 42 may be configured for:

sending the downlink beam information to the network side device, and the network side device obtains terminal location information and/or beam quality information for beam management from the downlink beam information.

The apparatus provided in this embodiment can implement all the method steps that can be implemented by the above method embodiments, and can achieve the same beneficial effects, then the same content and beneficial effects in this apparatus embodiment and the above method embodiments will not be described in detail here.

Figure 5:
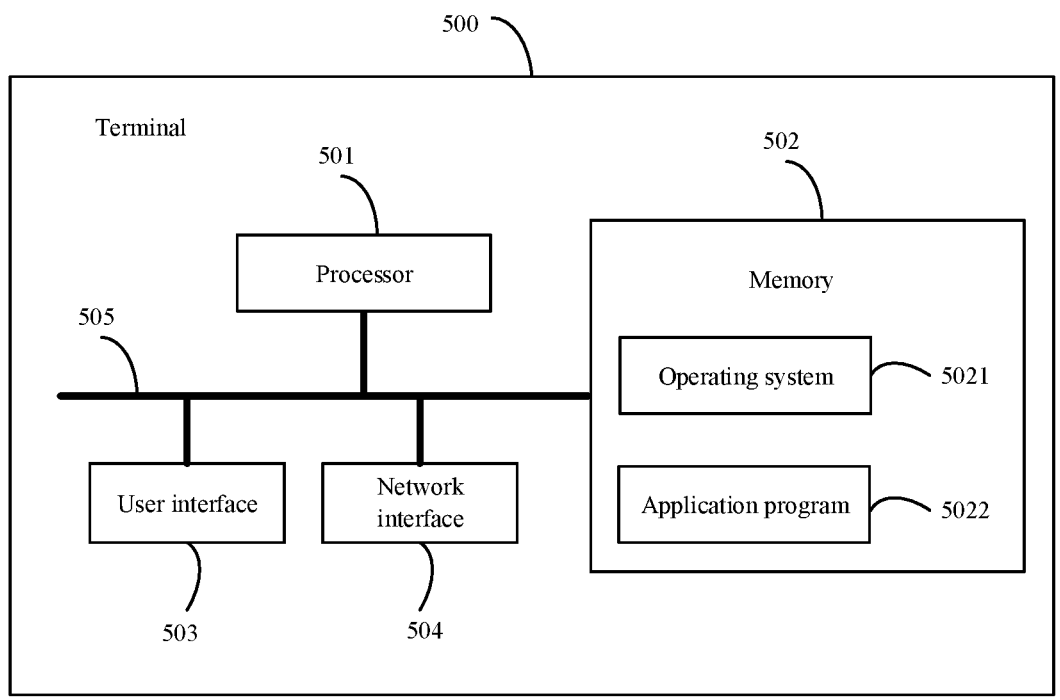
FIG. 5 is a schematic structural diagram of a terminal according to an embodiment of the present application.

FIG. 5 is a schematic structural diagram of a terminal according to an embodiment of the present application. As shown in FIG. 5, a terminal 500 may include: at least one processor 501, a memory 502, at least one network interface 504 and another user interfaces 503. The various components in terminal 500 are coupled together through a bus system 505. The bus system 505 is used to perform the connection communication between these components. In addition to the data bus, the bus system 505 also includes a power bus, a control bus and a status signal bus. However, for clarity of illustration, the various buses are labeled as the bus system 505 in FIG. 5.

Herein, the user interface 503 may include a display, a keyboard, or a clicking device, such as a mouse, a trackball, a touch pad, or a touch screen.

It can be understood that the memory 502 in this embodiment of the present application may be a volatile memory or a non-volatile memory, or may include both volatile and non-volatile memory. Herein, the non-volatile memory may be read-only memory (ROM), programmable ROM (PROM), erasable PROM (EPROM), electrically EPROM (EEPROM) or flash memory. The volatile memory may be random access memory (RAM), which is used as an external cache. By way of example and not limitation, many forms of RAM are available, such as static RAM (SRAM), dynamic RAM (DRAM), synchronous DRAM (SDRAM), double data rate SDRAM (DDRSDRAM), enhanced SDRAM (ESDRAM), Synchlink DRAM (SLDRAM) and direct Rambus RAM (DRRAM). The memory 502 of the systems and methods described in various embodiments of the present application is intended to include, but not be limited to, these and any other suitable types of memory.

In some embodiments, memory 502 stores the following components: executable devices or data structures, or subsets thereof, or extended sets of them, such as operating system 5021 and application program 5022.

Herein, the operating system 5021 includes various system programs, such as a framework layer, a core library layer, a driver layer and the like, to implement various basic services and process hardware-based tasks. The application program 5022 includes various application programs, such as a media player, a browser and the like, to implement various application services. The program for implementing the methods of the embodiments of the present application may be included in the application program 5022.

In an embodiment of the present application, by calling the computer program or instruction stored in the memory 502, In one embodiment, it can be the computer program or instruction stored in the application program 5022, the processor 501 is configured for:

determining beam information for beam management, where the beam information includes uplink beam information or downlink beam information;

sending the beam information to a network side device, and the network side device determines specified information for beam management according to the beam information, and determines transmission beams for signal transmission and/or a change trend of transmission beam according to the specified information and network deployment information;

where the specified information includes terminal location information and/or beam quality information, and the signal transmission includes uplink signal transmission or downlink signal transmission.

The methods disclosed in the above embodiments of the present application may be applied to the processor 501, or implemented by the processor 501. The processor 501 may be an integrated circuit chip with signal processing capability. In the implementation process, each step of the above methods may be completed by an integrated logic circuit of hardware in the processor 501 or an instruction in the form of software. The above processor 501 may be a general-purpose processor, a digital signal processor (DSP), an application specific integrated circuit (ASIC), a field programmable gate array (FPGA) or other programmable logic devices, discrete gate or transistor logic devices, discrete hardware components. The methods, steps, and logic block diagrams disclosed in the embodiments of this application may be implemented or executed. A general-purpose processor may be a microprocessor or the processor may be any conventional processor and the like. The steps of the method disclosed in conjunction with the embodiments of the present application may be directly embodied as executed by a hardware decoding processor, or executed by a combination of hardware and software devices in the decoding processor. The software devices may be located in random access memory, flash memory, read-only memory, programmable read-only memory or electrically erasable programmable memory, registers and other storage media mature in the art. The storage medium is located in the memory 502, and the processor 501 reads the information in the memory 502, and completes the steps of the above methods in combination with its hardware.

It will be appreciated that the embodiments described herein may be implemented in hardware, software, firmware, middleware, microcode, or a combination thereof. For hardware implementation, the processing unit may be implemented in one or more application specific integrated circuits (ASIC), digital signal processing (DSP), DSP device (DSPD), programmable logic device (PLD), field-programmable gate array (FPGA), general purpose processor, controller, microcontroller, microprocessor, other electronic unit for performing the functions described in this application or a combination thereof.

For software implementation, the described techniques can be implemented through devices (such as procedures, functions and the like) that perform the functions described in the embodiments of the present application. Software codes can be stored in memory and executed by a processor. The memory can be implemented in the processor or external to the processor.

In another embodiment,
the determining beam information for beam management includes:
receiving network side configuration information or indication information sent by the network side device, where the network side configuration information or indication information is used for indicating the terminal to send uplink signal for beam quality measurement; and
determining the uplink signal and/or terminal location information as the uplink beam information;
the sending the beam information to a network side device, includes:
sending the uplink beam information to the network side device, and the network side device measures the quality of the uplink signal in the uplink beam information, and obtains beam quality information corresponding to the uplink signal, where the beam quality information corresponding to the uplink signal is the beam quality information for beam management.
In another embodiment, the
the determining beam information for beam management, includes:
receiving a downlink signal for beam quality measurement sent by the network side device;
measuring the quality of the downlink signal to obtain the beam quality information corresponding to the downlink signal; and
determining the beam quality information corresponding to the downlink signal and/or terminal location information as the downlink beam information;
the sending the beam information to a network side device, includes:
sending the downlink beam information to the network side device, and the network side device obtains terminal location information and/or beam quality information for beam management from the downlink beam information.

The terminal provided in this embodiment of the present application can implement each process implemented by the terminal in the foregoing embodiments, and details are not described herein again to avoid repetition.

By determining beam information for beam management, where the beam information includes uplink beam information or downlink beam information, and sending the beam information to a network side device, the network side device can thus determine specified information for beam management according to the beam information, and determines transmission beams for signal transmission and/or the change trend of transmission beam according to the specified information and network deployment information, the problem of high overhead and time delay caused by the frequent beam sweeping process in high-speed occasions is solved, the beam management strategy is optimized, and beam sweeping time and beam overhead are saved.

Figure 6:
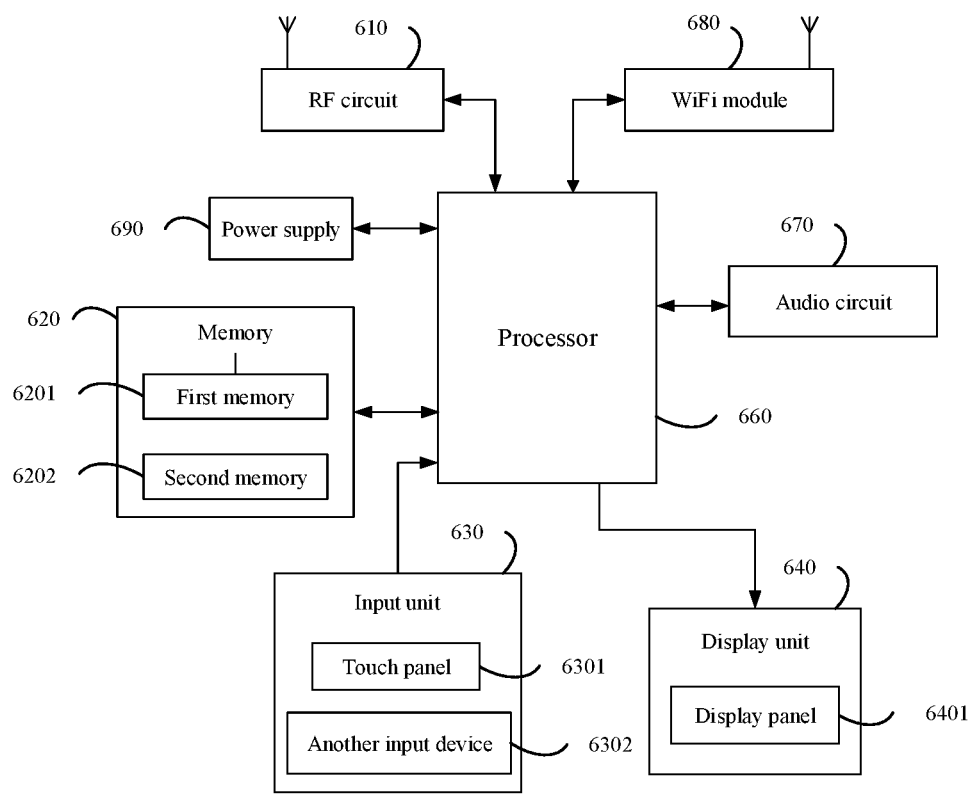
FIG. 6 is a schematic structural diagram of another terminal according to an embodiment of the present application.

FIG. 6 is a schematic structural diagram of another terminal according to an embodiment of the application. The terminal in FIG. 6 may be a mobile phone, a tablet computer, a personal digital assistant (PDA), or an electronic reader, a handheld game console, point of sales (POS), vehicle electronic devices (vehicle computers) and the like. As shown in FIG. 6, the terminal includes a radio frequency (RF) circuit 610, a memory 620, an input device 630, a display device 640, a processor 660, an audio circuit 670, a wireless fidelity (WiFi) device 680 and a power supply 690. The structure of the mobile phone shown in FIG. 6 does not constitute a limitation on the mobile phone, and may include more or less components than those shown in the figure, or combine some components, or separate some components, or have different component arrangements.

Herein, the input device 630 can be used for receiving the numerical or character information input by the user, and generating the signal input related to the user setting and function control of the terminal. In one embodiment, in this embodiment of the present application, the input device 630 may include a touch panel 6301. The touch panel 6301 is also known as the touch screen, which can collect the user's touch operations on or near it (such as the user's operations on the touch panel 6301 using any suitable objects or accessories such as fingers, stylus and the like) and drives the corresponding connection devices according to preset programs. In one embodiment, the touch panel 6301 may include a touch detection device and a touch controller. The touch detection device is configured to detect the user's touch orientation, detect the signal brought by the touch operation, and transmit the signal to the touch controller; the touch controller is configured to receive the touch information from the touch detection device, convert it into contact coordinates, and then send it to the processor 660, and can receive the commands sent by the processor 660 and execute them. In addition, the touch panel 6301 can be implemented in various types such as resistive, capacitive, infrared, and surface acoustic waves. In addition to the touch panel 6301, the input device 630 may also include other input devices 6302, which may be used to receive input numeric or character information, and generate key signal input related to user settings and function control of the terminal. In one embodiment, other input devices 6302 may include, but not limited to, one or more of physical keyboards, function keys (such as volume control keys, switch keys and the like), trackballs, mice, joysticks, optical mice (optical mice are touch-sensitive mice that do not display visual output surface, or an extension of a touch-sensitive surface formed by a touch screen) and the like.

Herein, the display device 640 may be used to display information input by the user or information provided to the user and various menu interfaces of the terminal. The display device 640 may include a display panel 6401. The display panel 6401 can be configured in the form of a liquid crystal display (LCD), an organic light-emitting diode (OLED) and the like.

It should be noted that the touch panel 6301 can cover the display panel 6401 to form a touch display screen. When the touch display screen detects a touch operation on or near it, the touch operation is transmitted to the processor 660 to determine the type of touch event, and then the processor 660 provides corresponding visual output on the touch display screen according to the type of touch event.

The touch screen includes the application program interface display area and the common control display area. The arrangement of the application program interface display area and the common control display area is not limited, and may be an arrangement that can distinguish the two display areas, such as up-down arrangement, left-right arrangement and the like. The application program interface display area can be used to display the interface of the application program. Each interface may contain at least one application icon and/or interface components such as widget desktop controls. The application program interface display area can also be an empty interface that does not contain any content. The common control display area is used to display controls with high usage rate, such as setting buttons, interface numbers, scroll bars, phonebook icons and other application icons.

The RF circuit 610 can be used for receiving and sending signals during sending and receiving information or during a call. In particular, after being received from the network side, the downlink information is processed by the processor 660. In addition, the related uplink data is sent to the network side. Typically, the RF circuit 610 includes, but not limited to, an antenna, at least one amplifier, a transceiver, a coupler, a low noise amplifier (LNA), a duplexer and the like. In addition, RF circuitry 610 may also communicate with networks and other devices via wireless communications. The wireless communication can use any communication standard or protocol, including but not limited to global system of mobile communication (GSM), general packet radio service (GPRS), code division multiple access (CDMA), wideband code division multiple access (WCDMA), long term evolution (LTE), email, short messaging service (SMS) and the like.

The memory 620 is used to store software programs and devices, and the processor 660 executes various functional applications and data processing of the terminal by running the software programs and devices stored in the memory 620. The memory 620 may mainly include a stored program area and a stored data area, where the stored program area may store an operating system, an application program required for at least one function (such as a sound playback function, an image playback function, etc.) and the like; the stored data area may store the data created according to the usage of the terminal (such as audio data, phone book and the like) and the like. Additionally, the memory 620 may include high-speed random-access memory, and may also include non-volatile memory, such as at least one magnetic disk storage device, a flash memory device, or other volatile solid state storage device.

Herein the processor 660 is the control center of the terminal, using various interfaces and lines to connect various parts of the entire mobile phone, running or executing the software programs and/or devices stored in a first memory 6201, and calling the data stored in a second memory 6202, to perform various functions of the terminal and process data, to monitor the terminal as a whole. In one embodiment, the processor 660 may include one or more processing units.

In this embodiment of the present application, by calling the software programs and/or devices stored in the first memory 6201 and/or data stored in the second memory 6202, the processor 660 is configured for:

determining beam information for beam management, where the beam information includes uplink beam information or downlink beam information; and sending the beam information to a network side device, and the network side device determines specified information for beam management according to the beam information, and determines transmission beams for signal transmission and/or a change trend of transmission beam according to the specified information and network deployment information;

where the specified information includes terminal location information and/or beam quality information, and the signal transmission includes uplink signal transmission or downlink signal transmission.

In another embodiment, the determining beam information for beam management, includes: receiving network side configuration information or indication information sent by the network side device, where the network side configuration information or indication information is used for indicating the terminal to send an uplink signal for beam quality measurement; and determining the uplink signal and/or terminal location information as the uplink beam information;

the sending the beam information to a network side device, includes:

sending the uplink beam information to the network side device, and the network side device measures the quality of the uplink signal in the uplink beam information, and obtains beam quality information corresponding to the uplink signal, where the beam quality information corresponding to the uplink signal is the beam quality information for beam management.

In another embodiment, the determining beam information for beam management, includes:

receiving downlink signal for beam quality measurement sent by the network side device;

measuring the quality of the downlink signal to obtain the beam quality information corresponding to the downlink signal; and determining the beam quality information corresponding to the downlink signal and/or terminal location information as the downlink beam information;

sending the beam information to a network side device, includes:

sending the downlink beam information to the network side device, and the network side device obtains terminal location information and/or beam quality information for beam management from the downlink beam information.

The terminal provided in this embodiment of the present application can implement each process implemented by the terminal in the foregoing embodiments, and details are not described herein again to avoid repetition.

By determining beam information for beam management, where the beam information includes uplink beam information or downlink beam information, and sending the beam information to a network side device, the network side device can thus determine specified information for beam management according to the beam information, and determines transmission beams for signal transmission and/or a change trend of transmission beam according to the specified information and network deployment information, the problem of high overhead and time delay caused by the frequent beam sweeping process in high-speed occasions is solved, the beam management strategy is optimized, and beam sweeping time and beam overhead and saved.

Figure 7:
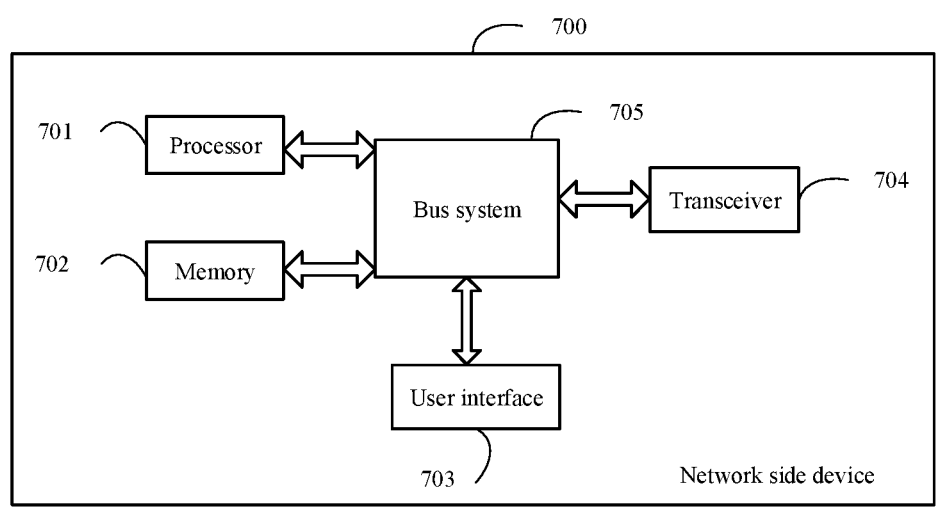
FIG. 7 is a schematic structural diagram of a network side device according to an embodiment of the present application.

FIG. 7 is a schematic structural diagram of a network side device according to an embodiment of the present application. As shown in FIG. 7, the network side device 700 may include at least one processor 701, a memory 702, at least one other user interface 703, and a transceiver 704. Various components in the network side device 700 are coupled together through a bus system 705. It can be understood that the bus system 705 is used to implement the connection communication between these components. In addition to the data bus, the bus system 705 also includes a power bus, a control bus and a status signal bus. However, for the sake of clarity, the various buses are labeled as the bus system 705 in FIG. 7, and the bus system may include any number of interconnected buses and bridges. In one embodiment, one or more processors represented by the processor 701 and various circuits represented by the memory 702 are linked together. The bus system can also link together various other circuits, such as peripheral devices, voltage regulators, and power management circuits, which are well known in the art, and therefore will not be further described in this embodiment of the present application. The bus interface provides an interface. The transceiver 704 may be multiple components, that is, including a transmitter and a receiver, which provides a unit for communicating with various other devices on a transmission medium. For different user equipment, the user interface 703 may also be an interface capable of externally connecting and internally connecting the required equipment, and the connected equipment includes but is not limited to a keypad, a display, a speaker, a microphone, a joystick, and the like.

It can be understood that the memory 702 in this embodiment of the present application may be a volatile memory or a non-volatile memory, or may include both volatile and non-volatile memory. The non-volatile memory may be read-only memory (ROM), programmable ROM (PROM), erasable PROM (EPROM), electrically EPROM (EEPROM) or flash memory. The volatile memory may be random access memory (RAM), which is used as an external cache. By way of example and not limitation, many forms of RAM are available, such as static RAM (SRAM), dynamic RAM (DRAM), synchronous DRAM (SDRAM), double data rate SDRAM (DDRSDRAM), enhanced SDRAM (ESDRAM), Synchlink DRAM (SLDRAM) and direct Rambus RAM (DRRAM). The memory 702 of the systems and methods described in various embodiments of the present application is intended to include, but not be limited to, these and any other suitable types of memory.

The processor 701 is responsible for managing the bus system and general processing, and the memory 702 can store computer programs or instructions used by the processor 701 when performing operations. In one embodiment, the processor 701 can be configured for: receiving beam information for beam management sent by a terminal, where the beam information includes uplink beam information or downlink beam information;
determining specified information for beam management according to the beam information, where the specified information includes terminal location information and/or beam quality information; and
determining transmission beams for signal transmission and/or a change trend of transmission beam according to the specified information and network deployment information, where the signal transmission includes uplink signal transmission or downlink signal transmission.

The methods disclosed in the above embodiments of the present application may be applied to the processor 701 or implemented by the processor 701. The processor 701 may be an integrated circuit chip with signal processing capability. In the implementation process, each step of the above methods may be completed by an integrated logic circuit of hardware in the processor 701 or an instruction in the form of software. The above processor 701 may be a general-purpose processor, a digital signal processor (DSP), an application specific integrated circuit (ASIC), a field programmable gate array (FPGA) or other programmable logic devices, discrete gate or transistor logic devices, discrete hardware components. The methods, steps, and logic block diagrams disclosed in the embodiments of this application may be implemented or executed. A general-purpose processor may be a microprocessor or the processor may be any conventional processor and the like. The steps of the method disclosed in conjunction with the embodiments of the present application may be directly embodied as executed by a hardware decoding processor, or executed by a combination of hardware and software devices in the decoding processor. The software devices may be located in random access memory, flash memory, read-only memory, programmable read-only memory or electrically erasable programmable memory, registers and other storage media mature in the art. The storage medium is located in the memory 702, and the processor 701 reads the information in the memory 702, and completes the steps of the above method in combination with its hardware.

It will be appreciated that the embodiments described herein may be implemented in hardware, software, firmware, middleware, microcode, or a combination thereof. For hardware implementation, the processing unit may be implemented in one or more application specific integrated circuits (ASIC), digital signal processing (DSP), DSP device (DSPD), programmable logic device (PLD), field-programmable gate array (FPGA), general purpose processor, controller, microcontroller, microprocessor, other electronic unit for performing the functions described in this application or a combination thereof.

For software implementation, the described techniques can be implemented through devices (such as procedures, functions and the like) that perform the functions described in the embodiments of the present application. Software codes can be stored in memory and executed by a processor. The memory can be implemented in the processor or external to the processor.

In another embodiment, the receiving beam information for beam management sent by a terminal, includes:
sending network side configuration information or indication information to the terminal, where the network side configuration information or indication information is used for indicating the terminal to send an uplink signal for beam quality measurement; and
receiving the uplink beam information sent by the terminal, where the uplink beam information includes the uplink signal and/or terminal location information.

In another embodiment, the determining specified information for beam management according to the beam information, includes:

measuring the quality of the uplink signal in the uplink beam information to obtain beam quality information corresponding to the uplink signal;

determining the beam quality information corresponding to the uplink signal as beam quality information for beam management; and determining the terminal location information reported by the terminal as the terminal location information for beam management.

In another embodiment, the receiving beam information for beam management sent by a terminal, includes:

sending downlink signal for beam quality measurement to the terminal, and the terminal measures the quality of the downlink signal to obtain beam quality information corresponding to the downlink signal; and receiving the downlink beam information reported by the terminal, where the downlink beam information includes beam quality information corresponding to the downlink signal and/or terminal location information.

In another embodiment, the determining specified information for beam management according to the beam information, includes:

determining the beam quality information corresponding to the downlink signal as beam quality information for beam management; and determining the terminal location information reported by the terminal as the terminal location information for beam management; or determining the terminal location information for beam management according to the beam quality information reported by the terminal.

In another embodiment, the terminal location information is a location identifier determined by the terminal according to a rule pre-agreed with the network side; where the location identifier is obtained by positioning of a global positioning system (GPS) of the terminal.

In another embodiment, the terminal location information is angle information of a channel through which the downlink signal passes, and the angle information is used to determine the location of the terminal.

In another embodiment, the processor 701 is further configured for: the network deployment information includes one or more of line map information, beam information covered by the line, network antenna configuration, network topology, beam distribution information or beam location information;

where the beam information covered by the line includes one or more of an optimal beam, a change trend of beam or a change trend of beam quality at each position along the line in different moving directions.

In another embodiment, the processor 701 is further configured for: the network deployment information is pre-stored on the network side device or a cloud device.

In another embodiment, the network deployment information is determined by the network side device according to the beam information reported by all terminals in a specified area within a specified time period, and the location information of all the terminals in the specified area within a specified time period.

In another embodiment, the determining transmission beams for signal transmission and/or the change trend of transmission beam according to the specified information and network deployment information, includes:

determining a location of the terminal according to the terminal location information;

determining the network deployment information of the line where the terminal is located according to the location of the terminal; and determining transmission beams for signal transmission and/or the change trend of transmission beam according to the network deployment information of the line where the terminal is located and the beam quality information.

In another embodiment, the determining transmission beams for signal transmission and/or the change trend of transmission beam according to the specified information and network deployment information, includes:

determining moving direction of the terminal according to the terminal location information; and determining transmission beams for signal transmission and/or the change trend of transmission beam according to the moving direction of the terminal and the network deployment information.

The network side device provided in the embodiments of the present application can implement each process implemented by the network side device in the foregoing embodiments, and details are not described herein again to avoid repetition.

By determining specified information for beam management, where the specified information includes terminal location information and/or beam quality information, and determining transmission beams for signal transmission and/or the change trend of transmission beam according to the terminal location information and/or beam quality information and network deployment information, the great overhead and delay problems caused by the frequent beam sweeping process in high-speed occasions are solved, the beam management strategy is optimized and beam sweeping time and beam overhead are saved.

The foregoing mainly introduces the solutions provided by the embodiments of the present application from the perspective of network side devices. It can be understood that, in order to implement the above functions, the network side device provided in the embodiments of the present application includes hardware structures and/or software devices corresponding to executing each function. The unit and algorithm steps of each example described in conjunction with the embodiments disclosed in the present application can be implemented in hardware or in the form of a combination of hardware and computer software.

Whether a function is performed by hardware or computer software driving hardware depends on the specific application and design constraints of the solution. The described functionality using different methods for each particular application, but such implementations should not be considered beyond the scope of this application.

In this embodiment of the present application, division of functional devices may be performed on network side devices and the like according to the foregoing method examples. For example, each functional device may be divided corresponding to each function, and two or more functions may be integrated into one processing device. The above integrated devices can be implemented in the form of hardware, and can also be implemented in the form of software function devices.

It should be noted that, the division of devices in the embodiments of the present application is schematic, and is only a logical function division, and there may be other division manners in actual implementation.

For the convenience and conciseness of the description, only the division of the above functional devices is used for illustration. In practical applications, the above functions can be allocated to different functional devices as required, that is, the internal structure of the device is divided into different functional devices to complete all or part of the functions described above. For the specific working process of the system, apparatus and unit described above, reference may be made to the corresponding process in the foregoing method embodiments, and details are not described herein again.

In the several embodiments provided in this application, the disclosed apparatus and method may be implemented in other manners. For example, the device embodiments described above are only illustrative. For example, the division of the devices or units is only a kind of logical function division, and there may be other division manners in actual implementation. For example, multiple units or components may be in combination or integrated into another system, or some features may be omitted, or not implemented. Besides, the shown or discussed mutual coupling or direct coupling or communication connection may be indirect coupling or communication connection of devices or units through some interfaces.

The units described as separate components may or may not be physically separated, and components displayed as units may or may not be physical units, that is, may be located in one place, or may be distributed to multiple network units. Part or all of the units may be selected according to actual needs to achieve the purpose of the solution in this embodiment.

In addition, each functional unit in each embodiment of the present application may be integrated into one processing unit, or each unit may exist physically alone, or two or more units may be integrated into one unit. The above integrated single components can be implemented in the form of software functional units.

The integrated device, if implemented in the form of a software functional unit and sold or used as an independent product, may be stored in a computer-readable storage medium. Based on this understanding, all or part of the solution can be embodied in the form of a software product, and the computer software product is stored in a storage medium, and includes several instructions to cause a computer device (which can be a personal computer, a server, or a network device or the like) or a processor to execute all or part of the steps of the methods described in the various embodiments of the present application. The computer storage medium is a non-transitory medium, including: flash memory, removable hard disk, read-only memory, random access memory, magnetic disk or optical disk and other mediums that can store program codes.

On the other hand, an embodiment of the present application further provides a non-transitory computer-readable storage medium having a computer program stored thereon, and the computer program, when executed by a processor, causes the processor to perform the methods provided by the foregoing embodiments, including:
receiving beam information for beam management sent by a terminal, where the beam information includes uplink beam information or downlink beam information;
determining specified information for beam management according to the beam information, where the specified information includes terminal location information and/or beam quality information; and
determining transmission beams for signal transmission and/or the change trend of transmission beam according to the specified information and network deployment information, where the signal transmission includes uplink signal transmission or downlink signal transmission.

On the other hand, an embodiment of the present application further provides a non-transitory computer-readable storage medium having a computer program stored thereon and the computer program, when executed by a processor causes the processor to perform the methods provided by the foregoing embodiments, including:
determining beam information for beam management, where the beam information includes uplink beam information or downlink beam information; and
sending the beam information to a network side device, and the network side device determines specified information for beam management according to the beam information, and determines transmission beams for signal transmission and/or the change trend of transmission beam according to the specified information and network deployment information;
where the specified information includes terminal location information and/or beam quality information, and the signal transmission includes uplink signal transmission or downlink signal transmission.

What is claimed is:

1. A method for beam management, performed by a network side device, comprising:
receiving beam information for beam management sent by a terminal, wherein the beam information comprises uplink beam information or downlink beam information;
determining specified information for beam management according to the beam information, wherein the specified information comprises terminal location information and/or beam quality information; and
determining transmission beams for signal transmission and/or a change trend of transmission beam according to the specified information and network deployment information, wherein the signal transmission comprises uplink signal transmission or downlink signal transmission, the network deployment information comprises one or more of map information of a line, beam information covered by the line, network antenna configuration, network topology, beam distribution information or beam location information; wherein the beam information covered by the line comprises one or more of an optimal beam, a change trend of beam or a change trend of beam quality at each position along the line in different moving directions.

2. The method of claim 1, wherein the receiving beam information for beam management sent by a terminal, comprises:
sending network side configuration information or indication information to the terminal, wherein the network side configuration information or indication information is used for indicating the terminal to send an uplink signal for beam quality measurement; and
receiving the uplink beam information sent by the terminal, wherein the uplink beam information comprises the uplink signal and/or terminal location information.

3. The method of claim 2, wherein the terminal location information is a location identifier determined by the terminal according to a rule pre-agreed with the network side, wherein the location identifier is obtained by positioning of a global positioning system (GPS) of the terminal.

4. The method of claim 1, wherein the receiving beam information for beam management sent by a terminal, comprising:
sending a downlink signal for beam quality measurement to the terminal, the downlink signal is used for indicating the terminal to measure quality of the downlink signal to obtain beam quality information corresponding to the downlink signal; and receiving the downlink beam information reported by the terminal, wherein the downlink beam information comprises beam quality information corresponding to the downlink signal and/or terminal location information.

5. The method of claim 1, wherein
the network deployment information is determined by the network side device according to the beam information reported by all terminals in a specified area within a specified time period, and the location information of all the terminals in the specified area within the specified time period.

6. The method of claim 1, wherein the determining transmission beams for signal transmission and/or a change trend of transmission beam according to the specified information and network deployment information, comprises:
   determining a location of the terminal according to the terminal location information;
   determining the network deployment information of the line where the terminal is located according to the location of the terminal; and
   determining transmission beams for signal transmission and/or the change trend of transmission beam according to the network deployment information of the line where the terminal is located and the beam quality information.

7. The method of claim 1, wherein the determining transmission beams for signal transmission and/or the change trend of transmission beam according to the specified information and network deployment information, comprises:
   determining a moving direction of the terminal according to the terminal location information; and
   determining transmission beams for signal transmission and/or the change trend of transmission beam according to the moving direction of the terminal and the network deployment information.

8. A method for beam management, performed by a terminal, comprising:
   determining beam information for beam management, wherein the beam information comprises uplink beam information or downlink beam information; and
   sending the beam information to a network side device for indicating the network side device to determine specified information for beam management according to the beam information, and determine transmission beams for signal transmission and/or a change trend of transmission beam according to the specified information and network deployment information;
   wherein the specified information comprises terminal location information and/or beam quality information, and the signal transmission comprises uplink signal transmission or downlink signal transmission, the network deployment information comprises one or more of map information of a line, beam information covered by the line, network antenna configuration, network topology, beam distribution information or beam location information; wherein the beam information covered by the line comprises one or more of an optimal beam, a change trend of beam or a change trend of beam quality at each position along the line in different moving directions.

9. The method of claim 8, wherein the determining beam information for beam management, comprises:
   receiving network side configuration information or indication information sent by the network side device, the network side configuration information or indication information being used for indicating the terminal to send an uplink signal for beam quality measurement; and
   determining the uplink signal and/or terminal location information as the uplink beam information; and
   wherein the sending the beam information to a network side device, comprises:
   sending the uplink beam information to the network side device for indicating the network side device to measure quality of the uplink signal in the uplink beam information to obtain beam quality information corresponding to the uplink signal, the beam quality information corresponding to the uplink signal being the beam quality information for beam management.

10. The method of claim 8, wherein the determining beam information for beam management, comprises:
    receiving a downlink signal for beam quality measurement sent by the network side device;
    measuring the quality of the downlink signal to obtain the beam quality information corresponding to the downlink signal; and
    determining the beam quality information corresponding to the downlink signal and/or terminal location information as the downlink beam information; and
    wherein the sending the beam information to a network side device, comprises:
    sending the downlink beam information to the network side device, the downlink beam information being used for the network side device to obtain terminal location information and/or beam quality information for beam management from the downlink beam information.

11. A network side device, comprising a processor, and a memory storing a program that is executable by the processor, wherein the program, when executed by the processor, causes the processor to perform the following steps:
    receiving beam information for beam management sent by a terminal, wherein the beam information comprises uplink beam information or downlink beam information;
    determining specified information for beam management according to the beam information, wherein the specified information comprises terminal location information and/or beam quality information; and
    determining transmission beams for signal transmission and/or a change trend of transmission beam according to the specified information and network deployment information, wherein the signal transmission comprises uplink signal transmission or downlink signal transmission, the network deployment information comprises one or more of map information of a line, beam information covered by the line, network antenna configuration, network topology, beam distribution information or beam location information; wherein the beam information covered by the line comprises one or more of an optimal beam, a change trend of beam or a change trend of beam quality at each position along the line in different moving directions.

12. The network side device of claim 11, wherein the receiving beam information for beam management sent by a terminal, comprises:
    sending network side configuration information or indication information to the terminal, wherein the network side configuration information or indication information is used for indicating the terminal to send an uplink signal for beam quality measurement; and receiving the uplink beam information sent by the terminal, wherein the uplink beam information comprises the uplink signal and/or terminal location information.

13. The network side device of claim 12, wherein the terminal location information is a location identifier determined by the terminal according to a rule pre-agreed with the network side, wherein the location identifier is obtained by positioning of a global positioning system (GPS) of the terminal.

14. The network side device of claim 11, wherein the receiving beam information for beam management sent by a terminal, comprising:
sending a downlink signal for beam quality measurement to the terminal, the downlink signal is used for indicating the terminal to measure the quality of the downlink signal to obtain beam quality information corresponding to the downlink signal; and
receiving the downlink beam information reported by the terminal, wherein the downlink beam information comprises beam quality information corresponding to the downlink signal and/or terminal location information.

15. The network side device of claim 11, wherein
the network deployment information is determined by the network side device according to the beam information reported by all terminals in a specified area within a specified time period, and the location information of all the terminals in the specified area within the specified time period.

16. The network side device of claim 11, wherein determining transmission beams for signal transmission and/or the change trend of transmission beam according to the specified information and network deployment information, comprises:
determining a location of the terminal according to the terminal location information;
determining the network deployment information of the line where the terminal is located according to the location of the terminal; and
determining transmission beams for signal transmission and/or the change trend of transmission beam according to the network deployment information of the line where the terminal is located and the beam quality information.

17. The network side device of claim 11, wherein the determining transmission beams for signal transmission and/or the change trend of transmission beam according to the specified information and network deployment information, comprises:

determining a moving direction of the terminal according to the terminal location information; and
determining transmission beams for signal transmission and/or the change trend of transmission beam according to the moving direction of the terminal and the network deployment information.

18. A terminal comprising a processor and a memory storing a program that is executable by the processor, wherein the program, when executed by the processor, causes the processor to perform steps of claim 13.

19. The terminal of claim 18, wherein:
the determining beam information for beam management, comprises:
receiving network side configuration information or indication information sent by the network side device, the network side configuration information or indication information being used for indicating the terminal to send an uplink signal for beam quality measurement; and
determining the uplink signal and/or terminal location information as the uplink beam information; and
wherein the sending the beam information to a network side device, comprises:
sending the uplink beam information to the network side device for indicating the network side device to measure the quality of the uplink signal in the uplink beam information to obtain beam quality information corresponding to the uplink signal, the beam quality information corresponding to the uplink signal being the beam quality information for beam management.

20. The terminal of claim 18, wherein,
the determining beam information for beam management, comprises:
receiving downlink signal for beam quality measurement sent by the network side device;
measuring the quality of the downlink signal to obtain the beam quality information corresponding to the downlink signal; and
determining the beam quality information corresponding to the downlink signal and/or terminal location information as the downlink beam information; and
wherein the sending the beam information to a network side device, comprises:
sending the downlink beam information to the network side device, the downlink beam information being used for the network device to obtain terminal location information and/or beam quality information for beam management from the downlink beam information.

* * * * *